US012099565B2

United States Patent
Seletskiy et al.

(10) Patent No.: US 12,099,565 B2
(45) Date of Patent: Sep. 24, 2024

(54) SYSTEMS AND METHOD FOR CACHING SHORTCODES AND DATABASE QUERIES

(71) Applicant: Cloud Linux Software Inc., Estero, FL (US)

(72) Inventors: Igor Seletskiy, Palo Alto (CA); Dmitriy Leonov, Moscow (RU); Ivan Zhmud, Kharkov (UA)

(73) Assignee: Cloud Linux Software Inc., Estero, FL (US)

(*) Notice: Subject to any disclaimer, the term of this patent is extended or adjusted under 35 U.S.C. 154(b) by 18 days.

(21) Appl. No.: 17/716,334

(22) Filed: Apr. 8, 2022

(65) Prior Publication Data
US 2023/0325454 A1    Oct. 12, 2023

(51) Int. Cl.
 G06F 16/957   (2019.01)
 H04L 67/143   (2022.01)
 H04L 67/306   (2022.01)

(52) U.S. Cl.
 CPC ........ G06F 16/9574 (2019.01); H04L 67/143 (2013.01); H04L 67/306 (2013.01)

(58) Field of Classification Search
 CPC .. G06F 16/9574; H04L 67/143; H04L 67/306
 See application file for complete search history.

(56) References Cited

U.S. PATENT DOCUMENTS

| | | | |
|---|---|---|---|
| 6,609,128 B1 * | 8/2003 | Underwood | G06F 9/454 707/610 |
| 6,757,708 B1 * | 6/2004 | Craig | G06F 16/9574 719/311 |
| 9,876,873 B1 * | 1/2018 | Teague | H04L 67/5682 |
| 10,296,568 B1 * | 5/2019 | Hancock | G06F 16/95 |
| 11,783,002 B2 * | 10/2023 | Brocato | H04L 67/02 709/203 |
| 2020/0097513 A1 * | 3/2020 | Zheng | H04L 67/1076 |

FOREIGN PATENT DOCUMENTS

WO    WO-2017147461 A1 *    8/2017

OTHER PUBLICATIONS

Baker "How to use Wordpress: Ultimate guide to building a Wordpress website", https://blog.hubspot.com/marketing/wordpress-website (Year: 2021).*

* cited by examiner

Primary Examiner — Glenton B Burgess
Assistant Examiner — Patrick F Ngankam
(74) Attorney, Agent, or Firm — ArentFox Schiff LLP; Michael Fainberg

(57) ABSTRACT

Disclosed herein are a system and method for caching shortcodes and database queries, a method including: detecting a request to load a webpage from a web browsing application on a first computing device, wherein the webpage includes a shortcode; determining a first amount of time spent executing the shortcode to load the webpage; determining whether the first amount of time is greater than a threshold amount of time; in response to determining that the first amount of time is greater than the threshold amount of time, identifying the shortcode as a cache candidate; determining a time-to-live (TTL) value for the shortcode; and storing content of the shortcode in a cache of a server hosting the webpage until the TTL value expires.

15 Claims, 7 Drawing Sheets

SYSTEMS AND METHOD FOR CACHING SHORTCODES AND DATABASE QUERIES

FIELD OF TECHNOLOGY

The present disclosure relates to the field of data retrieval performance optimization, and, more specifically, to systems and methods for caching shortcodes and database queries.

BACKGROUND

WordPress is an open-source content management system paired with a MySQL/MariaDB database that is used to build and host websites. WordPress supports "shortcodes," which have been introduced for creating macros to be used in themes or the contents of posts. Such macros may contain any custom PHP code, database queries, or external resources. The result of the execution of such macros is a block of content, which is inserted on a webpage.

Often the long execution times of such macros will block the loading of the webpage. For example, when a website has a slow database query, the loading of its pages slows down significantly. One of the solutions to this problem is to cache database (e.g., SQL) queries. Conventionally, caching saves a whole page or a portion of the page in quick access memory. If caching is enabled, the processing load for data retrieval on a server is reduced. However, when caching database queries, all or at least most of the queries have to be cached at once because standard caching technologies do not allow users to select specific database queries (rather they require caching all requests of a certain type). This inevitably leads to data actualizing problems. Not to mention, some database queries cannot be cached for data consistency.

SUMMARY

In particular, aspects of the disclosure describe methods and systems for caching shortcodes and database queries.

In one exemplary aspect, the techniques described herein relate to a method for caching shortcodes and database queries, the method including: detecting a request to load a webpage from a web browsing application on a first computing device, wherein the webpage includes a shortcode; determining a first amount of time spent executing the shortcode to load the webpage; determining whether the first amount of time is greater than a threshold amount of time; in response to determining that the first amount of time is greater than the threshold amount of time, identifying the shortcode as a cache candidate; determining a time-to-live (TTL) value for the shortcode; and storing content of the shortcode in a cache of a server hosting the webpage until the TTL value expires.

In some aspects, the techniques described herein relate to a method, wherein the webpage further includes a database query, further including: determining a second amount of time spent executing the database query to load the webpage; determining whether the second amount of time is greater than a threshold amount of time; in response to determining that the second amount of time is greater than the threshold amount of time, identifying the database query as a cache candidate; determining another time-to-live (TTL) value for the database query; and storing a result of the database query in the cache of the server hosting the webpage until the another TTL value expires.

In some aspects, the techniques described herein relate to a method, further including: determining that the TTL values has expired since storing the content of the shortcode in the cache; and removing the content of the shortcode from the cache.

In some aspects, the techniques described herein relate to a method, wherein identifying the shortcode as a cache candidate is further in response to determining that a threshold number of requests have been received for the webpage from a threshold number of computing devices, wherein the content of the shortcode is stored as a universal shortcode content.

In some aspects, the techniques described herein relate to a method, further including: detecting another request to load the webpage from a different web browsing application on a second computing device; determining whether the content of the shortcode exists in the cache; and in response to determining that the content of the shortcode exists in the cache, retrieving the content to include in the webpage.

In some aspects, the techniques described herein relate to a method, further including preventing macro execution of the shortcode.

In some aspects, the techniques described herein relate to a method, further including: detecting another request to load a different webpage including the shortcode; determining whether the content of the shortcode exists in the cache; and in response to determining that the content of the shortcode exists in the cache, retrieving the content to include in the different webpage.

In some aspects, the techniques described herein relate to a method, further including: determining whether the request is connected to a user session that is not anonymous; in response to determining the request is connected to the user session, determining whether the content of the shortcode depends on the user session; in response to determining that the content depends on the user session, storing the content of the shortcode in the cache under a key associated with the user session.

In some aspects, the techniques described herein relate to a method, further including: detecting another request to load the webpage from the web browsing application on the first computing device; and determining whether the content of the shortcode exists in the cache under the key associated with the user session; and in response to determining that the content of the shortcode exists in the cache under the key associated with the user session, retrieving the content to include in the webpage.

It should be noted that the methods described above may be implemented in a system comprising a hardware processor. Alternatively, the methods may be implemented using computer executable instructions of a non-transitory computer readable medium.

In some aspects, the techniques described herein relate to a system for caching shortcodes and database queries, including: a memory; and a hardware processor communicatively coupled with the memory and configured to: detect a request to load a webpage from a web browsing application on a first computing device, wherein the webpage includes a shortcode; determine a first amount of time spent executing the shortcode to load the webpage; determine whether the first amount of time is greater than a threshold amount of time; in response to determining that the first amount of time is greater than the threshold amount of time, identify the shortcode as a cache candidate; determine a time-to-live (TTL) value for the shortcode; and store content of the shortcode in a cache of a server hosting the webpage until the TTL value expires.

In some aspects, the techniques described herein relate to a non-transitory computer readable medium storing thereon computer executable instructions for caching shortcodes and database queries, including instructions for: detecting a request to load a webpage from a web browsing application on a first computing device, wherein the webpage includes a shortcode; determining a first amount of time spent executing the shortcode to load the webpage; determining whether the first amount of time is greater than a threshold amount of time; in response to determining that the first amount of time is greater than the threshold amount of time, identifying the shortcode as a cache candidate; determining a time-to-live (TTL) value for the shortcode; and storing content of the shortcode in a cache of a server hosting the webpage until the TTL value expires.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for caching shortcodes and database queries. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The systems and methods of the present disclosure involve collecting anonymized statistics for shortcodes, determining a current database query by traceback and query part, and customizing caching parameters using decision-making algorithms. More specific aspects of the present disclosure describe systems and methods for caching shortcodes for WordPress optimization and SQL queries for improving the loading of webpages.

Figure 1:
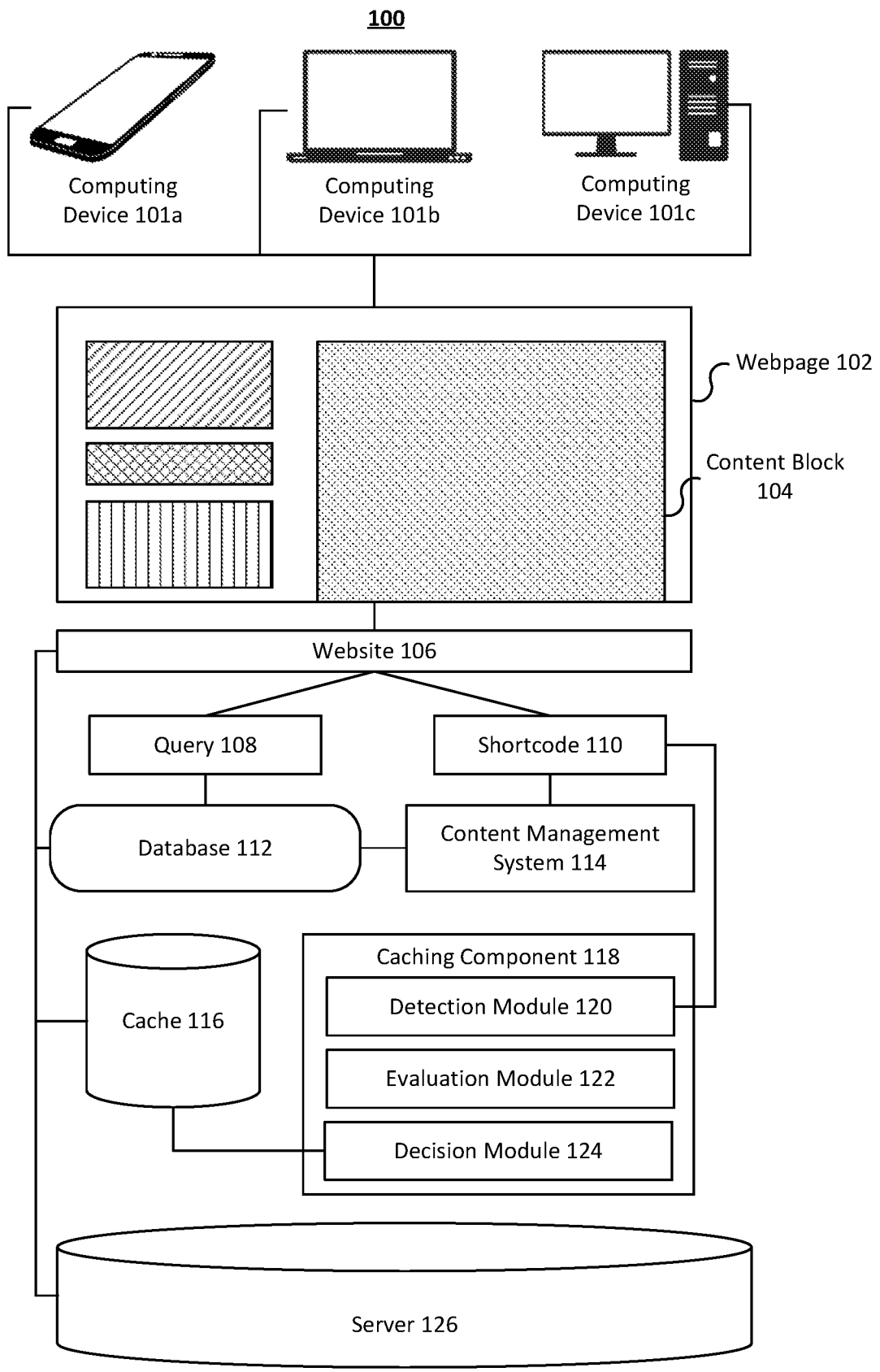
FIG. 1 is a block diagram illustrating a system for caching shortcodes and database queries.

FIG. 1 is a block diagram illustrating system 100 for caching shortcodes and database queries. System 100 depicts computing device 101a (e.g., a smartphone), computing device 101b (e.g., a laptop), and computing device 101c (e.g., a desktop computer). Only three devices are shown for simplicity, but there may be any number of computing devices involved in the system. Each computing device includes a web browsing application and is connected to the Internet. Any of the web browsing applications may send a HTTP request to server 126 using a URL of webpage 102. Server 126 may host website 106, which includes a plurality of webpages including webpage 102. In response to receiving the HTTP request, server 126 may transmit a HTTP response comprising webpage 102 corresponding to the URL.

Suppose that a developer used content management system (CMS) 114 (e.g., WordPress) to generate website 106. Content management system 114 may use database 112 (e.g., a MySQL database) to store information associated with website 106. Suppose that the developer used shortcode 110 in the code of website 106, and that shortcode 110 generates content block 104 on webpage 102. Accordingly, when transmitting the HTTP response to a respective web browsing application, server 126 executes shortcode 110. Likewise, if portions of webpage 102 require the retrieval of information from database 112, server 126 executes database query 108 (e.g., an SQL query).

As can be seen, if multiple computing devices send HTTP requests to server 126 for webpage 102, server 126 will make several redundant executions of shortcode 110 and query 108. Accordingly, the present disclosure presents caching component 118, which is a software that determines whether to store a particular query or shortcode in cache 116.

When using caching, the improvement of several indicators of a website is enabled. For example, the content loading speed increases. In addition, server resources are saved, and there is a reduction in CPU utilization (by not performing the same data retrieval operation multiple times).

Shortcode caching prevents macros execution, which reduces the overall request execution time and accelerates page loading (i.e., less processing by server 126 and faster page presentation on computing device 101). When a shortcode is requested, a cache search function is triggered by caching component 118. Processing of the shortcode is prohibited if there is a cache for the requested shortcode in cache 116. As a result, the cached shortcode is returned. In some aspects, cache 116 can be stored in any storage such as Memcached, Redis or other database services running on server 126.

Simply caching an entire webpage with a shortcode or database query is inefficient. Firstly, there is storage limit for a cache and storing an entire webpage takes more storage space than storing a portion of the webpage (e.g., a shortcode). In some cases, there may also be dynamic data that is changing periodically or continuously on a webpage. Accordingly, caching a webpage only for it to be outdated within a short period of time is inefficient. Lastly, one single shortcode may be utilized on multiple webpages. It is thus more efficient to cache said single shortcode for use in loading multiple webpages than to cache the multiple webpages (including caching the single shortcode multiple times) in their entirety.

Likewise it is not simple to cache every shortcode or database query. For efficient caching of shortcodes, additional data collection is required. Based on the collected data, caching component 118 makes a decision about parameters such as cache lifetime. In particular, caching component 118 includes detection module 120, evaluation module 122, and decision module 124. Detection module 120 detects queries and shortcodes, evaluation module 122 collects information about the detected queries and shortcodes, and decision module 124 determines a caching strategy based on the collected information.

In some aspects, parameters of a caching strategy include, but are not limited to: time to live (TTL), user dependency, page/URL dependency, locale dependency, database tables dependency, session dependency, source IP dependency, browser (browser agent) dependency, and browser signature dependency. Caching settings include a general execution time, plugin dependencies, and the information about whether the caching strategy is an auto-generated strategy.

Figure 2:
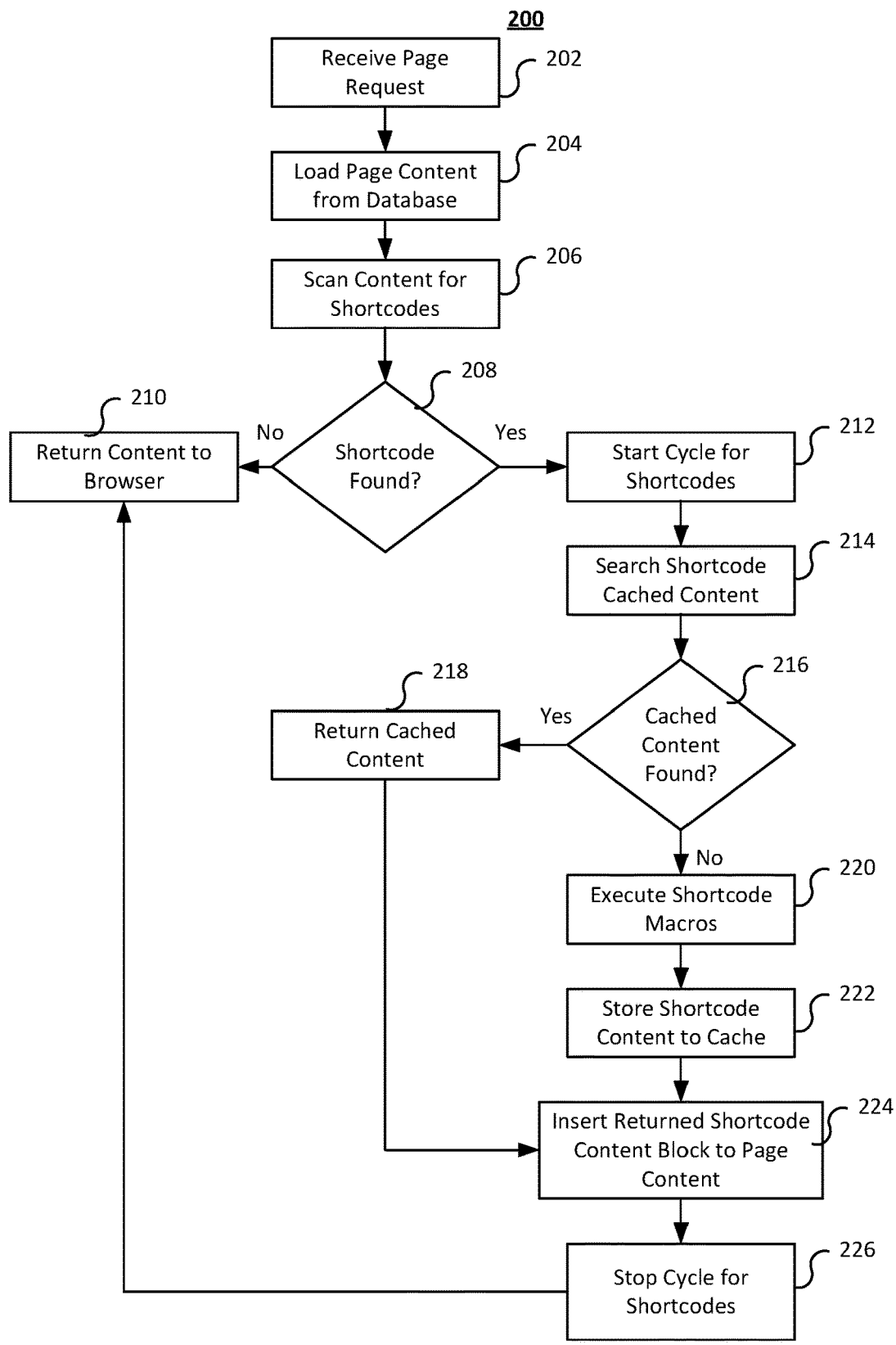
FIG. 2 illustrates a flow diagram of a method for detecting shortcodes.

FIG. 2 illustrates a flow diagram of method 200 for detecting shortcodes. At 202, server 126 receives a page request for webpage 102. The page request may originate, for example, from computing device 101*a*. At 204, server 126 loads page content from database 112. At 206, detection module 120 scans the loaded page content for any shortcodes (e.g., shortcode 110).

Detection module 120 may utilize two approaches to scan for shortcodes. In some aspects, when a CMS plugin or a separate application provides a page in the admin panel, the page includes a shortcodes list or database queries list. For each shortcode or database query, a shortcode/query string, type of database query, and current caching status are displayed. For example, the shortcodes list may be:

TABLE 1

| Shortcode/Database String | Query Type | Current Caching Status |
|---|---|---|
| [shop cart] | shortcode | cached |
| ... | ... | ... |
| SELECT * FROM wp_posts WHERE 1 = 1 LIMIT 5; | select | Learning (how to cache) |

In some aspects, caching component 118 may present table 1 to a user in a graphical user interface. Accordingly, detection module 120 may detect shortcodes using the list. In some aspects, the admin panel provides filtering and sorting data tables, and contains three actions for each record: (1) switch caching status, (2) switch caching strategy, and (3) edit caching strategy settings.

In some aspects, CMS plugins use hooks to catch shortcodes data. Thus, for each page request, a CMS plugin catches and accumulates information about all executed shortcodes. The CMS plugin may be an external plugin that includes native code execution in the shortcode lifecycle. For example, CMS 114 provides two entry point events: 'pre_do_shortcode_tag' and 'do_shortcode_tag.' At the end of the request, the accumulated information is provided to detection module 120. In some aspects, the accumulated information is written by detection module 120 to local or cloud storage.

In method 200, at 208, detection module 120 determines whether a shortcode was found. In response to determining that at least one shortcode was found, method 200 advances to 212, where the cycle for shortcodes is started. For example, at the time of page formation, CMS 114 finds all the shortcodes included in it and starts the macro execution cycle of these shortcodes; the result of macro execution is inserted into the page instead of the shortcodes. If no shortcode is found, method 200 ends at 210, where the page content loaded in 204 is returned to the web browser of the requesting computing device.

At 214, evaluation module 122 searches for the detected shortcode(s) in cache 116. At 216, evaluation module 122 determines whether the shortcode (e.g., shortcode 110) was found in cache 116. In response to determining that the shortcode is stored in cache 116, method 200 advances to 218, where server 126 returns the cached content. If the shortcode is not found stored in cache 116, method 200 advances to 220, where server 126 executes the shortcode macros. At 222, server 222 stores the shortcode content in cache 116. It should be noted that 222 is one approach to caching shortcodes. However, in an exemplary aspect, caching component 118 determines whether the shortcode should be cached at all.

From 218 and 222, method 200 advances to 224, where server 126 inserts the returned shortcode content block (e.g., content block 104) to the page content (e.g., webpage 102). At 226, the cycle for shortcodes stops and method 200 subsequently advances to 210.

Figure 3:
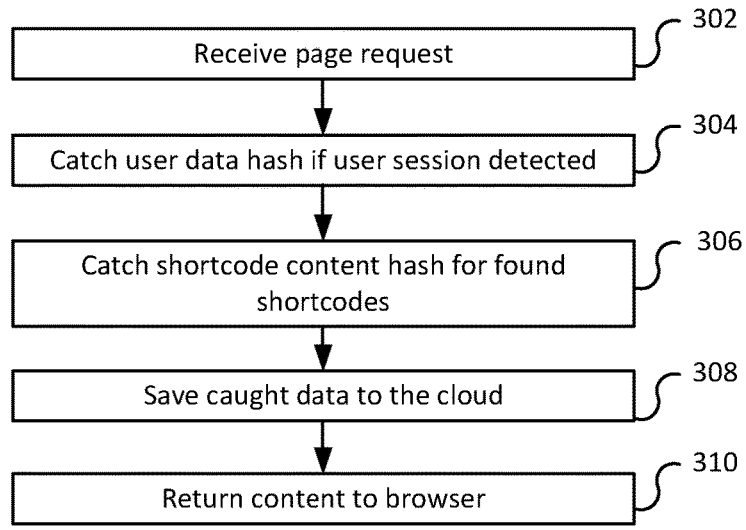
FIG. 3 illustrates a flow diagram of a method for collecting anonymized statistics for shortcodes.

FIG. 3 illustrates a flow diagram of method 300 for collecting anonymized statistics for shortcodes. FIG. 3 includes two parts: shortcodes pre-processing (e.g., searching cache 116) and shortcodes post-processing (e.g., storing in cache 116).

At 302, server 126 receives a page request from a web browsing application. To improve efficiency of the shortcode caching method, evaluation module 122 collects anonymized statistics for all shortcodes. More specifically, at 304 during the processing of the request, a programmatic hash of the user data (if the user is not anonymous and thus a user session is detected) is caught by evaluation module 122. At 306, evaluation module 122 further catches the content hash of each found shortcode. Collecting anonymized statistics for shortcodes allows for the understanding of how often the content generated by the shortcode changes and whether a given shortcode depends on the user session (i.e., whether the shortcode is different based on the user requesting the data). When caching shortcodes analytics for each shortcode, the following is caught: (1) shortcode string, (2) shortcode inner content ([sc]inner content[/sc]), (3) parameters, (4) callback function, (5) execution time, (6) number of execution during request, (7) SQL queries (types and affected tables), (8) result size, (9) result hash, (10) result, (11) page/URL dependency, (12) user dependency, (13) locale dependency, and (14) plugin dependency.

At 308, caching component 120 saves the caught data to the cloud. Having this data, decision module 124 determines whether to store the shortcode globally or for each user individually. Decision module 124 further determines a time to live (TTL) for the cached shortcode.

In some aspects, decision module 124 determines if a given shortcode or query can be cached based on how long and how often the shortcode and/or query executes. There are two actions that can be realized: decision module 124 can skip the shortcode or decision module 124 can display a caching strategy. If decision module 124 makes a decision not to cache, the collection of statistics for the particular shortcode/query is stopped.

At 310, server 126 returns the page content to the requesting web browsing application.

Figure 4:
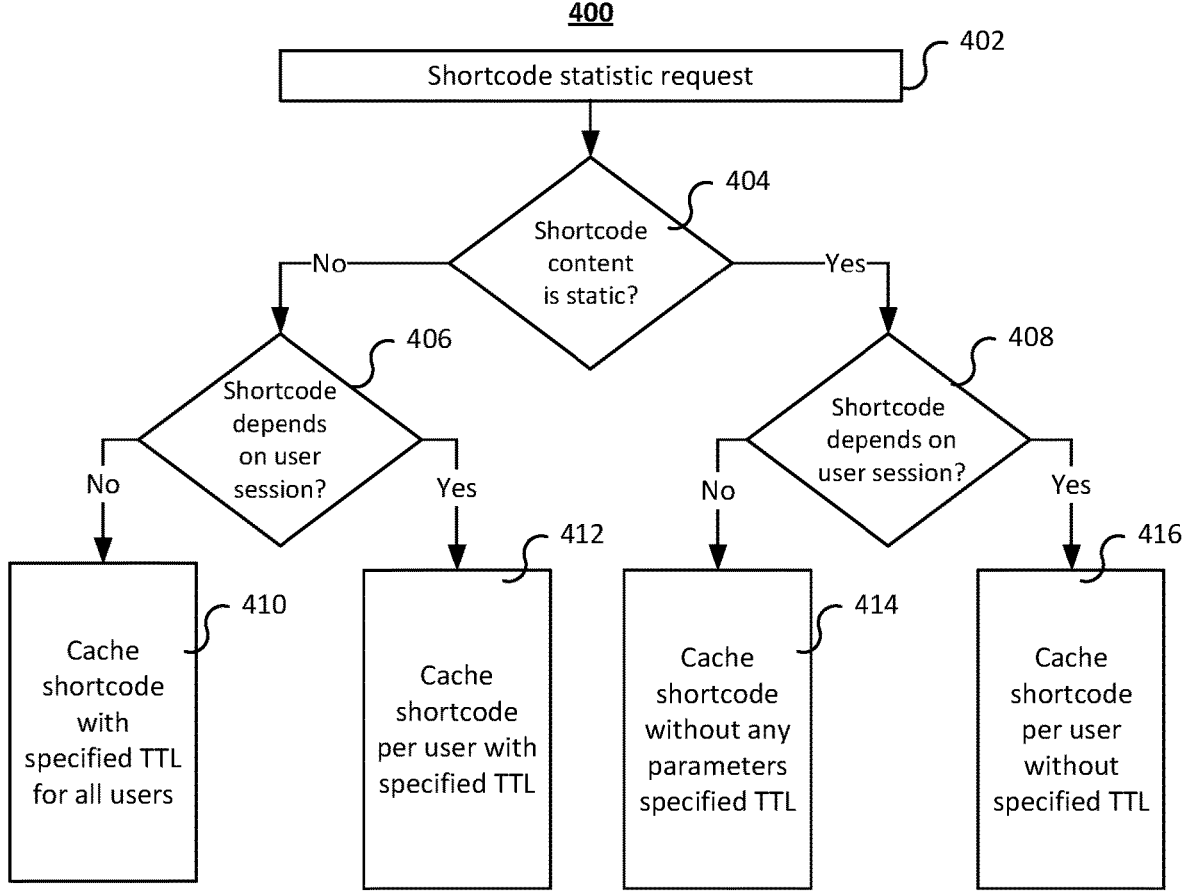
FIG. 4 illustrates a flow diagram of a method for customizing caching parameters.

FIG. 4 illustrates a flow diagram of method 400 for customizing caching parameters. At 402, decision module 124 makes a shortcode statistic request to evaluation module 122. At 404, decision module 124 determines whether the shortcode content is static. In response to determining that the shortcode content (e.g., content block 104) is static, method 400 advances to 408, where decision module 124 determines whether the shortcode depends on user session (e.g., whether the shortcode content is different for a first user compared to a second user). If a shortcode depends on If at 404, decision module 124 determines that the shortcode content is not static, method 400 advances to 406, where decision module 124 determines whether the shortcode depends on a user session. In response to determining that the shortcode content does not depend on the user session, method 400 advances to 410, where decision module 124 caches the shortcode with a specific TTL for all users. In response to determining that the shortcode content does depend on the user session, method 400 advances to 410, where decision module 124 caches the shortcode per user with a specific TTL for each user. The optimal TTL is determined either by setting a standard value (selected in advance based on personal usage), or by setting the most popular value (e.g., an average of a large number of TTLs). In the former, if a user frequently visits the webpage and invokes the shortcode/database query, the TTL may be set to a value that is greater than an average delay between visits to the webpage. Thus, if a user visits every one hour, the TTL may be set to 1 hour or more (e.g., 1.5 hours). Similarly in the latter, the average is taken for several different users. For example, if three users visit the webpage and invoke the shortcode/database query, the delay between their visits is averaged. In some aspects, a pad time is added to the average value (e.g., 0.5 hours) to ensure that the TTL does not expire just before a user visits.

In some aspects, when caching shortcodes in user session data, the following structure of a script may be considered:

```
<?php
//The first part of the method
function cacheshortcode_get_cache(string $output, string $tag, $attr, array $m)
{
$key = md5( $m[0] );
$cached_data = get_transient( 'cacheshortcode_cache' );
if ( $cached_data && isset( $cached_data[$key] ) ) {
    return $cached_data[$key];
  } else {
    return false;
}}
add_filter('pre_do_shortcode_tag', 'cacheshortcode_get_cache', 10, 4);
//The second part of the Method
function cacheshortcode_set_cache(string $output, string $tag, $attr, array $m)
{
 $key = md5( $m[0] );
   $cached_data = get_transient( 'cacheshortcode_cache' );
   $cached_data[$key] = $output;
   set_transient( 'cacheshortcode_cache', $cached_data );
   return $output;
}
add_filter('do_shortcode_tag', 'cacheshortcode_set_cache', 10, 4);
``` a user session, page, or other parameters that affect the splitting of the cache for such a shortcode, then the cache for the shortcode is stored under a unique computed key containing all dependencies.

In response to determining that the shortcode depends on user session, method 400 advances to 416, where decision module 124 caches the shortcode per user without a specified TTL. This involves saving the shortcode in cache 116 for each user separately under a unique key (e.g., an encryption key) containing information belonging to each respective user. In response to determining that the shortcode does not depend on a user session, method 400 advances to 414, where decision module 124 caches the shortcode (i.e., a single universal shortcode) without any specified TTL.

This is a valid implementation of the caching mechanism.

1. After finding the shortcode, but before running its macro (event: 'pre_do_shortcode_tag'), the existence of a cache for the shortcode is checked (function cacheshortcode_get_cache).
2. If the cache is found, then the cache is returned (return $cached_data[$key];)
3. If the cache is not found, the shortcode macro is run (event: 'do_shortcode_tag'), the result is cached (function cacheshortcode_set_cache) and returned.

In some aspects, when caching shortcodes in Redis, the following structure of a script may be considered (here, the code is storing data to another storage (Redis)):

```php
<?php
//The first part of the method
function cacheshortcode_get_cache(string $output, string $tag, $attr, array $m)
{
    $key = md5( $m[0] );
    return $redis->get($key) ?? false;
}
add_filter('pre_do_shortcode_tag', 'cacheshortcode_get_cache', 10, 4);
//The second part of the Method
function cacheshortcode_set_cache(string $output, string $tag, $attr, array $m)
{
    $key = md5( $m[0] );
    $redis->set($key, $output);
    return $output;
}
add_filter('do_shortcode_tag', 'cacheshortcode_set_cache', 10, 4);
```

Figure 5:
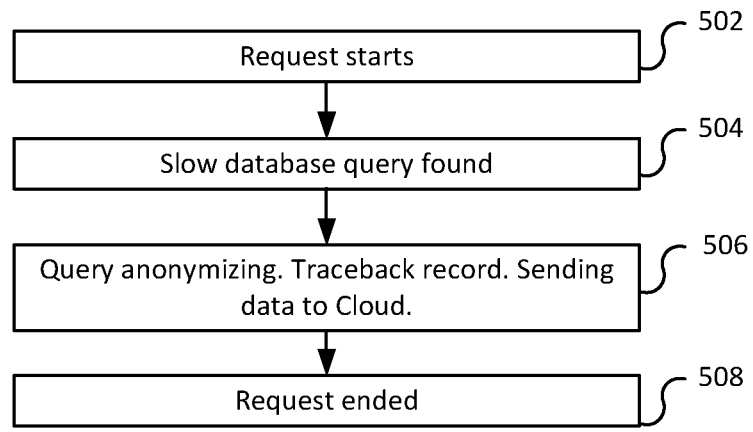
FIG. 5 illustrates a flow diagram of a method for catching a slow query.

FIG. 5 illustrates a flow diagram of method 500 for catching a slow query. At 502, a request for a web page is received. Generating the webpage may involve executing a database query. At 504, detection module 120 determines an amount of time taken to execute a database query. If the determined amount of time (e.g., 2 seconds) exceeds a threshold amount of time (e.g., 1 second), detection module 120 identifies the database query as a slow database query.

At 506, evaluation module 122 saves the traceback and the anonymized query text in a cloud server. The query is then marked as a caching contender. At 508, the request ends (i.e., the webpage is provided to the requesting web browsing application). In a subsequent request, a query is determined by the traceback and parts of the anonymized query content.

The following is an example of traceback:
PHP function debug_backtrace provides execution data:

```
#0 c( ) called at [/tmp/include.php:10]
#1 b( ) called at [/tmp/include.php:6]
#2 a( ) called at [/tmp/include.php:17]
#3 include(/tmp/include.php) called at [/tmp/test.php:3]
```

The following is an example of anonymized query content:

```
SELECT * FROM users WHERE username = 'AAAAAA0000AA'
'AAAAAA0000AA' – anonymized data
```

The algorithm for creating or returning a cache, if any, is then started.

In one exemplary aspect, a CMS plugin (e.g., caching component 118) using a database drop-in or custom database class for other CMS or sites catches database queries data. Thus, for each request, the plugin catches and accumulates information about all executed queries. At the end of the request, the accumulated information is written to the local or cloud storage. When caching database query analytics for each database query, the following may be caught: (1) query string, (2) type of query, (3) affected tables, (4) execution time, (5) number of execution during request, (6) result size, (7) result hash, and (8) result. The collection is done with the reference for all queries with relation to page, plugin, shortcode, user, and locale. For example, each found query and shortcode, the page on which the shortcode/query was executed is indicated, whether a specific user was authorized on this page, etc.

In some aspects, when caching SQL queries in user session data, the following structure of a script may be considered:

```php
// Processing query cache:
<?php
if ( in_array( $current_query_part, $stored_query_parts ) ) {
    $key = ( md5( $stored_query_parts ) );
    $result = $cache->get( $key );
    if ( ! $result ) {
        $result = $db->execute( $query );
        $cache->set( -key, $result );
    }
} else {
    $result = $db->execute( $query );
}
return $result;
// Saving data for caught slow query:
<?php
$request_data = $request->collect_anonimized_request_data( );
$anonimized_query_parts = $anonimizer->anonimize( $query );
$cloud->send( $anonimized_query_parts, $request_data );
```

As described previously, this code indicates that before executing a query to the database, the presence of a cached version is checked, and if it is found, the cache is returned. If there is no cached version, then the query is executed and the result is returned and stored in the cache.

In some aspects, decision module 124 compares results between requests by php based on text/function similarity. Decision module 124 then makes a decision based on caching shortcodes/database queries analytics (e.g., whether the data meets a defined custom similarity threshold (e.g., 99%) or simply provides that data to the user). Decision module 124 analyzes total memory allowed and total memory used. In addition, decision module 124 analyzes a result size to balance optimal cache and memory usage.

Decision module 124 also decides when it needs to flush cache based on specific caching settings (e.g., TTL) or changed settings (e.g., if caching settings such as TTL and dependencies change, the cache needs to be flushed), used table updates (e.g., if an update, delete, or insert request was made for a table, then the cache of all dependent requests and shortcodes is reset), and whether the composition of the database queries for the page has changed.

Figure 6:
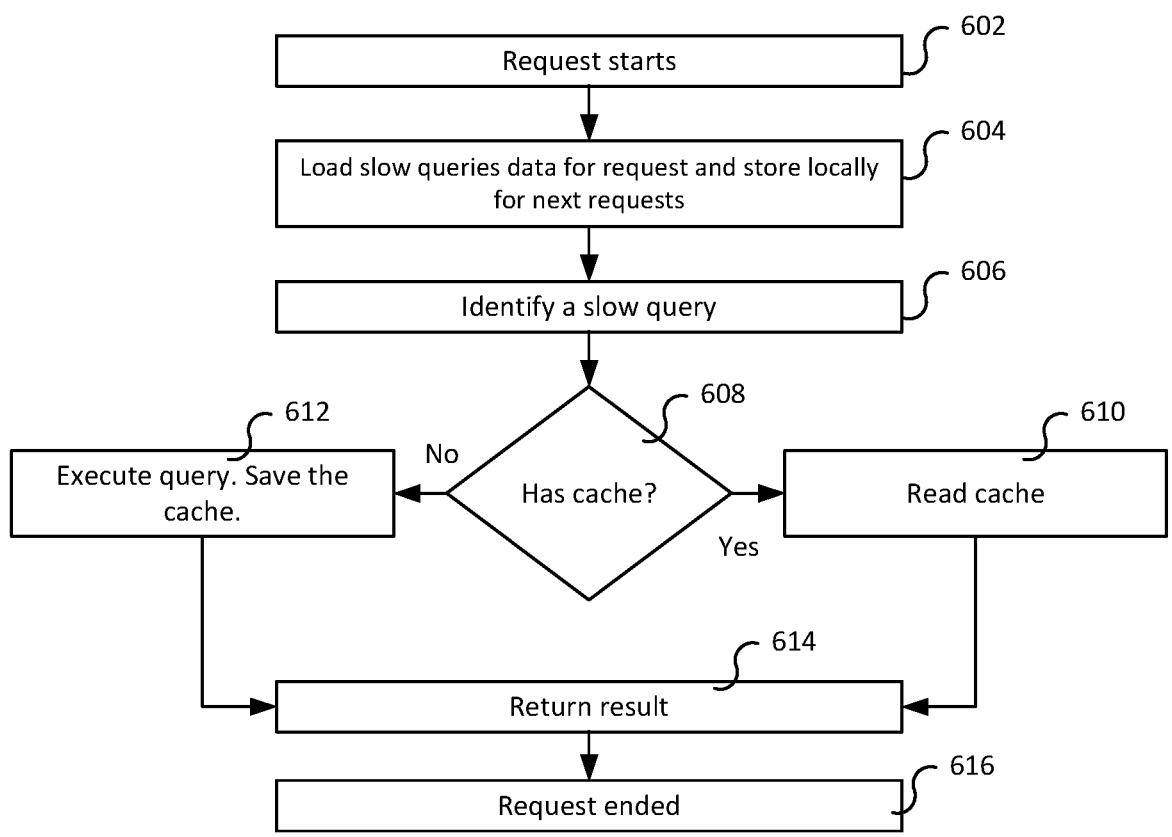
FIG. 6 illustrates a flow diagram of a method for cache processing for the slow query with a cloud request.

FIG. 6 illustrates a flow diagram of method 600 for cache processing for the slow query with a cloud request. At 602, a web page request starts. At 604, caching component 118 loads slow database queries for request and stores them locally for subsequent requests. At 606, caching component 118 identifies a slow query. At 608, caching component 118 determines whether the identified slow query has a cached result. In response to determining that a cached result does not exist in cache, method 600 advances to 612, where the query is executed and the result is cached. However, if at 608, caching component 118 determines that the cached result exists in the cache, method 600 advances to 610, where caching component 118 reads the cache. From 610 and 612, method advances to 614, where caching component 118 returns the result and at 616, the request ends.

Figure 7:
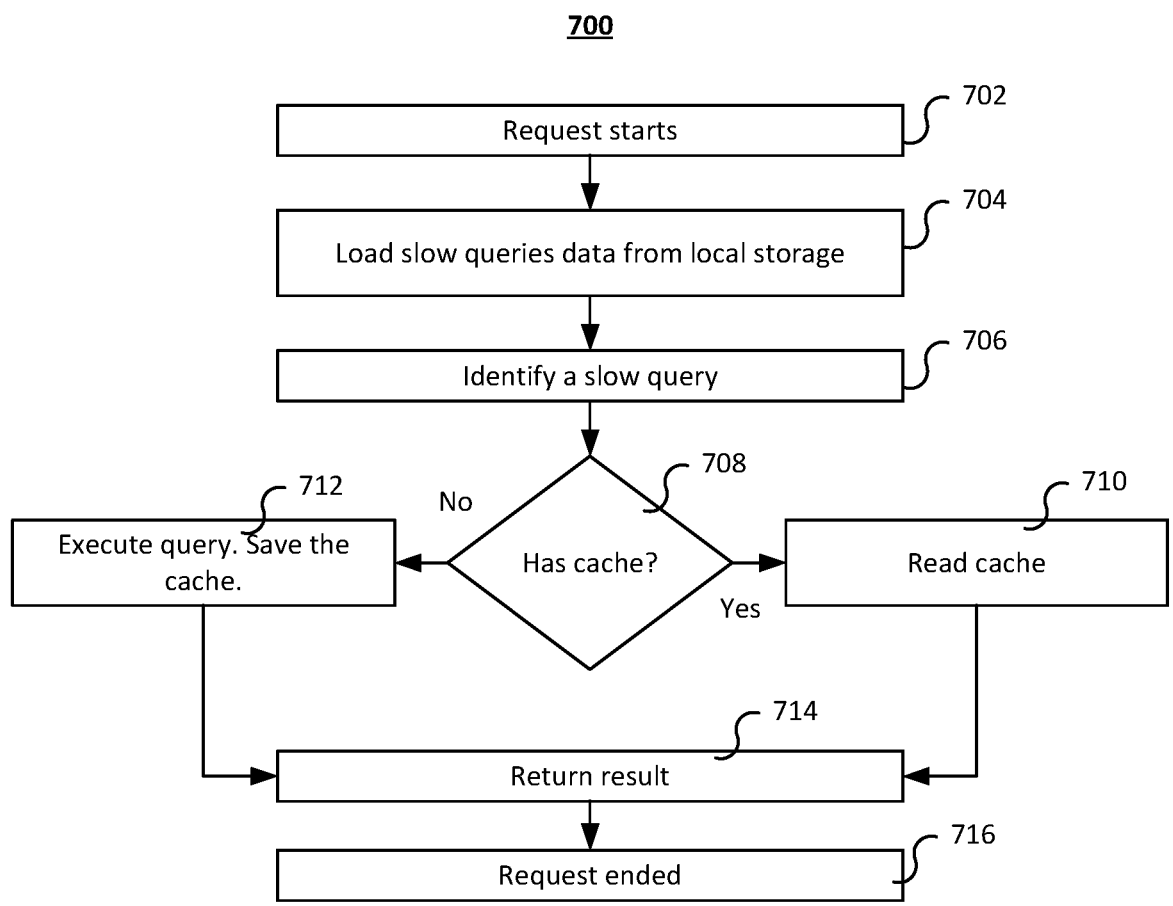
FIG. 7 illustrates a flow diagram of a method for cache processing for the slow query without a cloud request.

FIG. 7 illustrates a flow diagram of method 700 for cache processing for the slow query without a cloud request. At 702, a web page request starts. At 704, caching component 118 loads slow database queries from local storage. At 706, caching component 118 identifies a slow query. At 708, caching component 118 determines whether the identified slow query has a cached result. In response to determining that a cached result does not exist in cache, method 700 advances to 712, where the query is executed and the result is cached. However, if at 708, caching component 118 determines that the cached result exists in the cache, method 700 advances to 710, where caching component 118 reads the cache. From 710 and 712, method advances to 714, where caching component 118 returns the result and at 716, the request ends.

Figure 8:
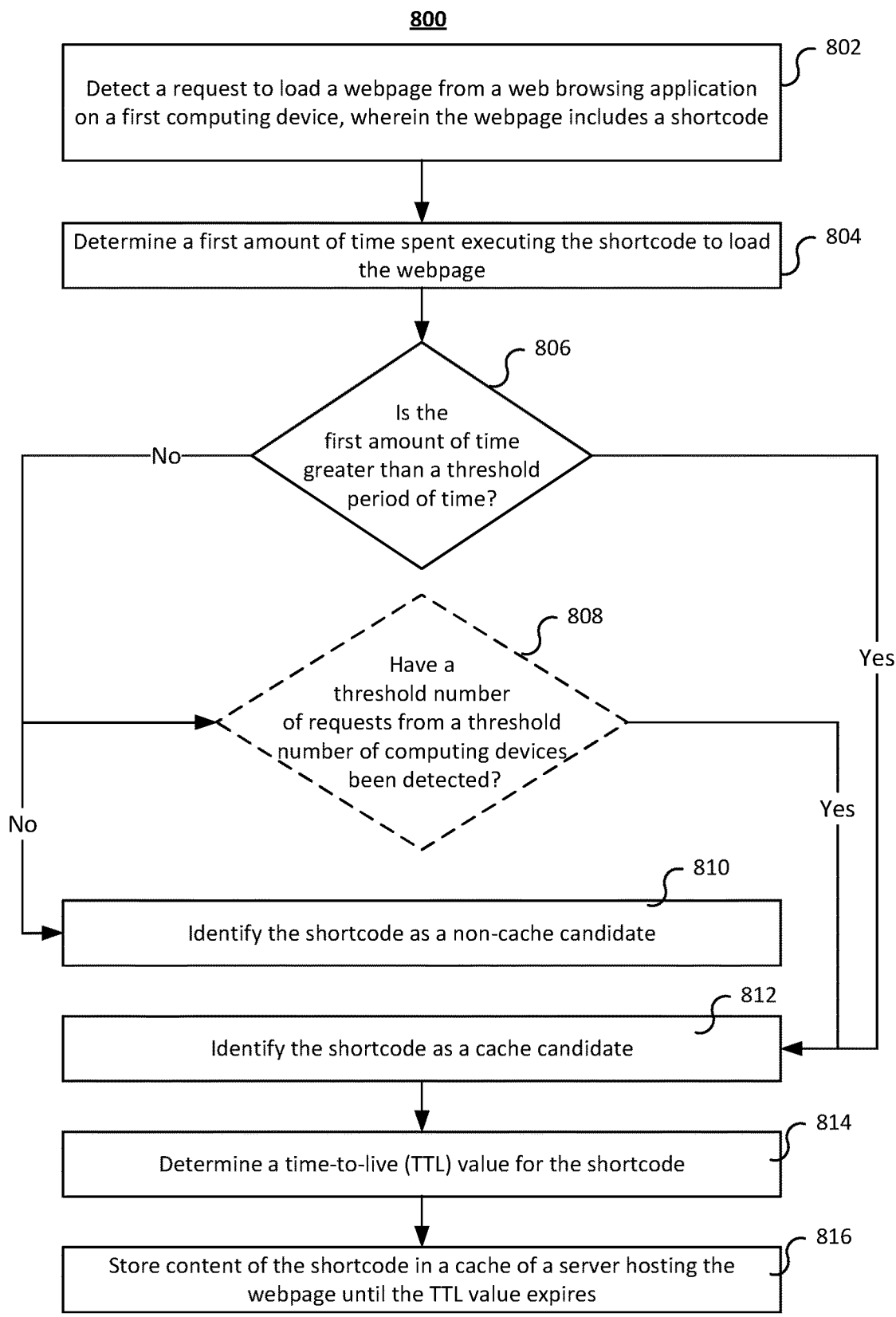
FIG. 8 illustrates a flow diagram of a method for caching shortcodes and database queries.

FIG. 8 illustrates a flow diagram of method 800 for caching shortcodes and database queries. At 802, caching component 118 detects a request to load a webpage (e.g., web page 102) from a web browsing application on a first computing device (e.g., device 101a), wherein the webpage includes a shortcode (e.g., shortcode 110). At 804, caching component 118 determines a first amount of time spent executing the shortcode to load the webpage. At 806, caching component 118 determines whether the first amount of time is greater than a threshold amount of time.

In some optional aspects, in response to determining that the first amount of time is greater than the threshold amount of time, method 800 advances to 808, where caching component 118 determines whether a threshold number of requests (e.g., 50) from a threshold number of computing devices (e.g., 25) have been detected. For example, whenever a request is detected, caching component 118 increments a request count and tracks the unique computing devices that have requested the webpage. The request count and computing device count is then compared to the threshold counts. In response to determining that the threshold number of requests from the threshold number of computing devices have been detected, method 800 advances to 812, where caching component 118 identifies the shortcode as a cache candidate. In an exemplary aspect, method 800 may advance from 806 to 812 directly.

If at 806 it is determined that the first amount of time is not greater than the threshold period of time, or the threshold number of requests have not been detected nor from a threshold number of computing devices, method 800 advances to 810, where caching component 118 identifies the shortcode as a non-cache candidate.

From 812, method 800 advances to 814, where caching component 118 determines a time-to-live (TTL) value for the shortcode. This may a predetermined universal TTL value or a personalized value based on user session. At 814, caching component 118 stores content (e.g., content block 104) of the shortcode in a cache (e.g., cache 116) of a server (e.g., server 126) hosting the webpage until the TTL value expires.

In some aspects, the webpage further includes a database query (e.g., query 108). Caching component 118 may thus determine a second amount of time spent executing the database query to load the webpage. Caching component 118 may determine whether the second amount of time is greater than a threshold amount of time (this may be the same time or a different time value than the one used to compare against the first amount of time). In response to determining that the second amount of time is greater than the threshold amount of time, caching component 118 may identify database query 108 as a cache candidate. Caching component 118 may then determine another time-to-live (TTL) value for database query 108 and store a result of database query 108 in cache 116 of server 126 hosting webpage 102 until the another TTL value expires.

In some aspects, caching component 118 may determine that the TTL values has expired since storing the content of shortcode 110 in cache 116, and remove the content of shortcode 110 from cache 116.

In some aspects, caching component 118 detects another request to load the webpage from a different web browsing application on a second computing device (e.g., computing device 101b). Caching component 118 may determine whether the content of shortcode 110 exists in cache 116. In response to determining that the content of shortcode 110 exists in cache 116, caching component 118 retrieves the content to include in the webpage. In some aspects, caching component 118 further prevents macro execution of shortcode 110.

In some aspects, caching component 118 detects another request to load a different webpage (e.g., of website 106 or a different website) comprising shortcode 110. Caching component 118 determines whether the content of shortcode 110 exists in cache 116. In response to determining that the content of shortcode 110 exists in cache 116, caching component 118 retrieves the content to include in the different webpage.

In some aspects, caching component 118 determines whether the request is connected to a user session that is not anonymous. In response to determining the request is connected to the user session, caching component 118 determines whether the content of shortcode 110 depends on the user session (i.e., content block 104 includes different information for a different user session). In response to determining that the content depends on the user session, caching component 118 stores the content of shortcode 110 in cache 116 under a key associated with the user session. In some aspects, caching component 118 may subsequently detect another request to load the webpage from the web browsing application on the first computing device (e.g., device 101a). Caching component 118 determines whether the content of shortcode 110 exists in cache 116 under the key associated with the user session. In response to determining that the content of the shortcode exists in the cache under the key associated with the user session, caching component 118 retrieves the content to include in webpage 102.

Figure 9:
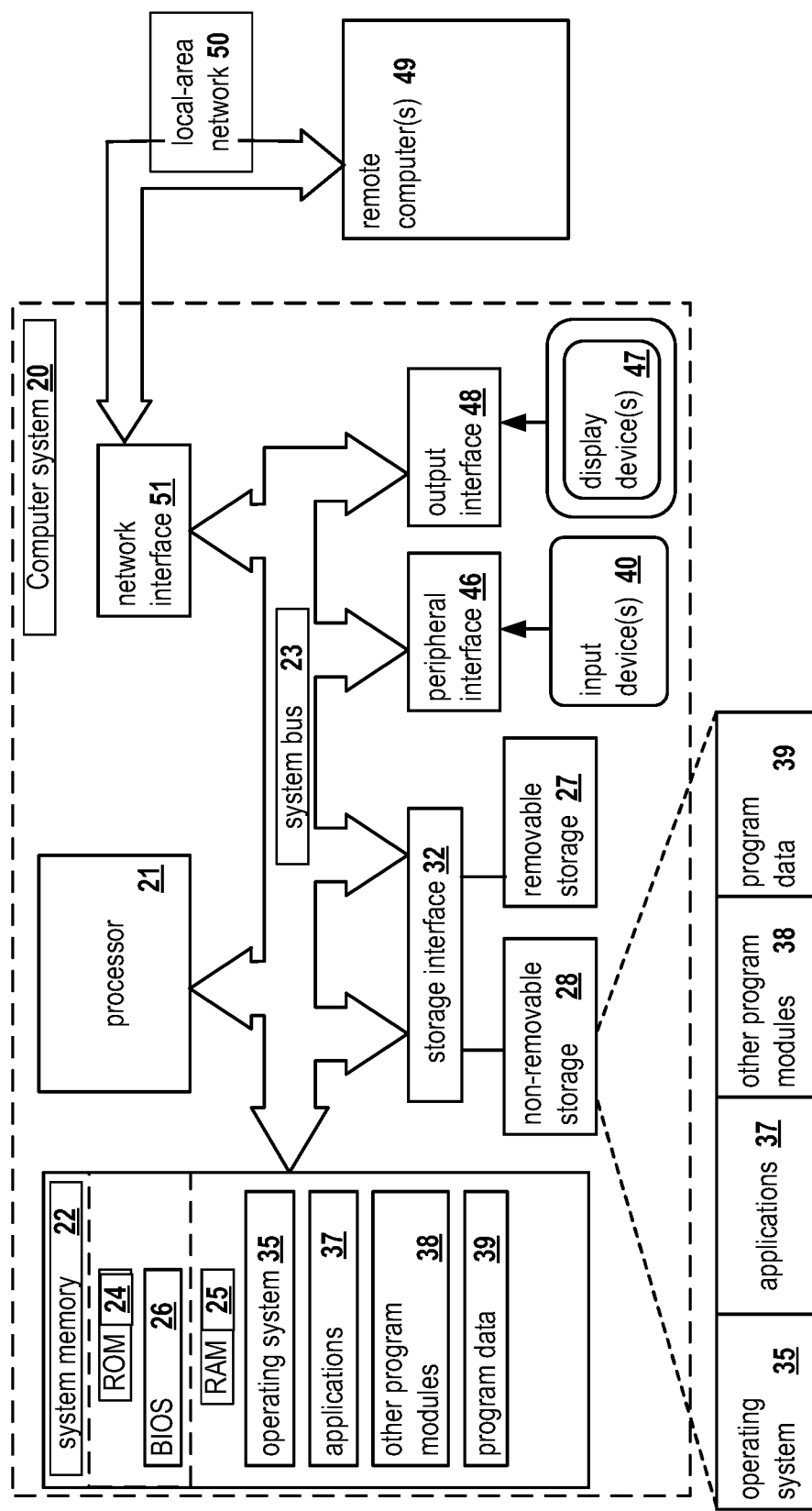
FIG. 9 presents an example of a general-purpose computer system on which aspects of the present disclosure can be implemented.

FIG. 9 is a block diagram illustrating a computer system 20 on which aspects of systems and methods for caching shortcodes and database queries may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for caching shortcodes and database queries, the method comprising:
    detecting a request to load a webpage from a web browsing application on a first computing device, wherein the webpage includes a shortcode;
    determining a first amount of time spent executing the shortcode to load the webpage;
    determining whether the first amount of time is greater than a threshold amount of time;
    in response to determining that the first amount of time is greater than the threshold amount of time, identifying the shortcode as a cache candidate;
    determining a time-to-live (TTL) value for the shortcode;
    determining whether the request is connected to a user session that is not anonymous;
    in response to determining the request is connected to the user session, determining whether content of the shortcode depends on the user session; and
    in response to determining that the content depends on the user session, storing the content of the shortcode in a cache of a server hosting the webpage under a key associated with the user session until the TTL value expires.

2. The method of claim 1, wherein the webpage is associated with a database query to load the webpage, further comprising:
    determining a second amount of time spent executing the database query to load the webpage;
    determining whether the second amount of time is greater than a threshold amount of time;
    in response to determining that the second amount of time is greater than the threshold amount of time, identifying the database query as a cache candidate;
    determining another time-to-live (TTL) value for the database query; and
    storing a result of the database query in the cache of the server hosting the webpage until the another TTL value expires.

3. The method of claim 1, further comprising:
    determining that the TTL values has expired since storing the content of the shortcode in the cache; and
    removing the content of the shortcode from the cache.

4. The method of claim 1, wherein identifying the shortcode as a cache candidate is further in response to determining that a threshold number of requests have been received for the webpage from a threshold number of computing devices, wherein the content of the shortcode is stored as a universal shortcode content.

5. The method of claim 4, further comprising:
    detecting another request to load the webpage from a different web browsing application on a second computing device;
    determining whether the content of the shortcode exists in the cache; and
    in response to determining that the content of the shortcode exists in the cache, retrieving the content to include in the webpage.

6. The method of claim 5, further comprising preventing macro execution of the shortcode.

7. The method of claim 1, further comprising:
    detecting another request to load the webpage from the web browsing application on the first computing device; and
    determining whether the content of the shortcode exists in the cache under the key associated with the user session; and
    in response to determining that the content of the shortcode exists in the cache under the key associated with the user session, retrieving the content to include in the webpage.

8. A system for caching shortcodes and database queries, comprising:
    a memory; and
    a hardware processor communicatively coupled with the memory and configured to:

detect a request to load a webpage from a web browsing application on a first computing device, wherein the webpage includes a shortcode;

determine a first amount of time spent executing the shortcode to load the webpage;

determine whether the first amount of time is greater than a threshold amount of time;

in response to determining that the first amount of time is greater than the threshold amount of time, identify the shortcode as a cache candidate;

determine a time-to-live (TTL) value for the shortcode;

determine whether the request is connected to a user session that is not anonymous;

in response to determining the request is connected to the user session, determine whether content of the shortcode depends on the user session; and in response to determining that the content depends on the user session, store the content of the shortcode in a cache of a server hosting the webpage under a key associated with the user session until the TTL value expires.

9. The system of claim 8, wherein the webpage is associated with a database query to load the webpage, and wherein the hardware processor is further configured to:

determine a second amount of time spent executing the database query to load the webpage;

determine whether the second amount of time is greater than a threshold amount of time;

in response to determining that the second amount of time is greater than the threshold amount of time, identify the database query as a cache candidate;

determine another time-to-live (TTL) value for the database query; and store a result of the database query in the cache of the server hosting the webpage until the another TTL value expires.

10. The system of claim 8, wherein the hardware processor is further configured to:

determine that the TTL values has expired since storing the content of the shortcode in the cache; and remove the content of the shortcode from the cache.

11. The system of claim 8, wherein the hardware processor is further configured to identify the shortcode as a cache candidate in response to determining that a threshold number of requests have been received for the webpage from a threshold number of computing devices, wherein the content of the shortcode is stored as a universal shortcode content.

12. The system of claim 11, wherein the hardware processor is further configured to:

detect another request to load the webpage from a different web browsing application on a second computing device;

determine whether the content of the shortcode exists in the cache; and in response to determining that the content of the shortcode exists in the cache, retrieve the content to include in the webpage.

13. The system of claim 12, wherein the hardware processor is further configured to prevent macro execution of the shortcode.

14. The system of claim 8, wherein the hardware processor is further configured to:

detect another request to load the webpage from the web browsing application on the first computing device; and determine whether the content of the shortcode exists in the cache under the key associated with the user session; and in response to determining that the content of the shortcode exists in the cache under the key associated with the user session, retrieve the content to include in the webpage.

15. A non-transitory computer readable medium storing thereon computer executable instructions for caching shortcodes and database queries, including instructions for:

detecting a request to load a webpage from a web browsing application on a first computing device, wherein the webpage includes a shortcode;

determining a first amount of time spent executing the shortcode to load the webpage;

determining whether the first amount of time is greater than a threshold amount of time;

in response to determining that the first amount of time is greater than the threshold amount of time, identifying the shortcode as a cache candidate;

determining a time-to-live (TTL) value for the shortcode;

determining whether the request is connected to a user session that is not anonymous;

in response to determining the request is connected to the user session, determining whether content of the shortcode depends on the user session; and in response to determining that the content depends on the user session, storing the content of the shortcode in a cache of a server hosting the webpage under a key associated with the user session until the TTL value expires.

* * * * *